(12) United States Patent
Weiss et al.

(10) Patent No.: US 7,874,607 B2
(45) Date of Patent: Jan. 25, 2011

(54) VEHICLE SEAT CONFIGURATION

(75) Inventors: Andreas Weiss, Wolfsburg (DE); Frank Lewetzky, Eppingen (DE); Jörg Dittus, Freiberg (DE)

(73) Assignees: Volkswagen Aktiengesellschaft, Wolfsburg (DE); Dr. Ing. h.c. F. Prosche Aktiengesellschaft, Stuttgart (DE)

( * ) Notice: Subject to any disclaimer, the term of this patent is extended or adjusted under 35 U.S.C. 154(b) by 299 days.

(21) Appl. No.: 11/893,239

(22) Filed: Aug. 14, 2007

(65) Prior Publication Data

US 2008/0042482 A1    Feb. 21, 2008

Related U.S. Application Data

(63) Continuation of application No. PCT/EP2005/013050, filed on Dec. 1, 2005.

(30) Foreign Application Priority Data

Feb. 16, 2005   (DE) .................. 10 2005 008 306
Apr. 27, 2005   (DE) .................. 10 2005 020 335

(51) Int. Cl.
*B60N 2/10*   (2006.01)
(52) U.S. Cl. ............. 296/65.05; 296/65.01; 297/312; 297/331; 297/335; 297/337
(58) Field of Classification Search ........... 296/65.09, 296/65.01, 65.05; 297/378.1, 452.18, 452.48, 297/312, 331, 335, 337
See application file for complete search history.

(56) References Cited

U.S. PATENT DOCUMENTS

| 3,632,157 | A | | 1/1972 | Lohr | |
|---|---|---|---|---|---|
| 4,636,006 | A | | 1/1987 | Kazaoka et al. | |
| 5,989,699 | A | * | 11/1999 | Kuczynski et al. | ....... 428/316.6 |
| 6,652,034 | B1 | | 11/2003 | Schramm et al. | |
| 2004/0150243 | A1 | * | 8/2004 | Epaud et al. | ............. 296/65.09 |
| 2004/0160081 | A1 | * | 8/2004 | Horsford et al. | ......... 296/65.09 |
| 2006/0022505 | A1 | * | 2/2006 | Pyzik et al. | ............ 297/452.58 |

FOREIGN PATENT DOCUMENTS

| DE | 299 10 294 U1 | 9/1999 |
|---|---|---|
| DE | 198 41 363 C1 | 4/2000 |
| DE | 199 62 424 C1 | 8/2001 |
| DE | 103 54 065 A1 | 6/2005 |
| EP | 0 985 575 A2 | 3/2000 |
| WO | WO 00/19865 A1 | 4/2000 |

\* cited by examiner

*Primary Examiner*—Joseph D Pape
(74) *Attorney, Agent, or Firm*—Manfred Beck, P.A.

(57) ABSTRACT

A motor vehicle seat has an element formed of expanded polypropylene foam or of a material with comparable properties with respect to its firmness and weight provided between a seat part and a vehicle body floor, wherein the seat part is directly or indirectly connected to the vehicle body floor via the element formed of expanded polypropylene foam or of the material with comparable properties with respect to its firmness and weight, or the seat part is formed essentially of expanded polypropylene foam or of a material with comparable properties with respect to its firmness and weight and is directly or indirectly connected to the vehicle body floor.

11 Claims, 7 Drawing Sheets

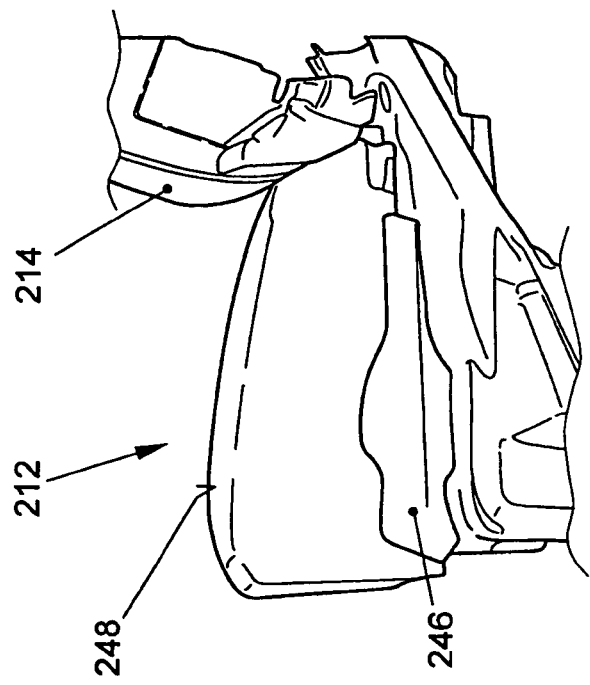
FIG. 9
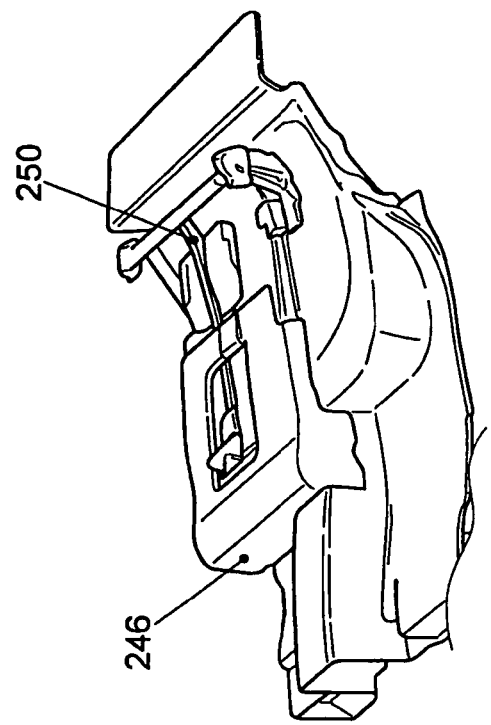
FIG. 8
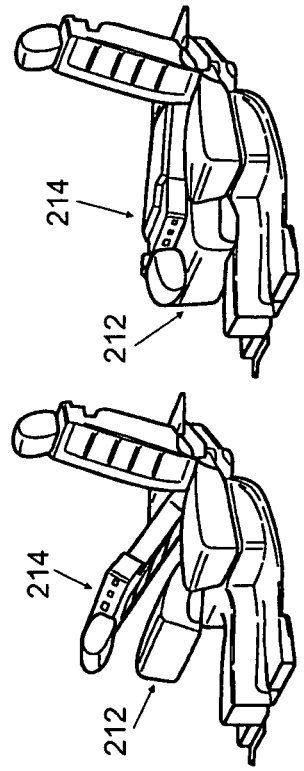
FIG. 12
FIG. 13
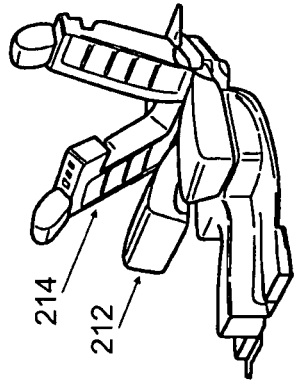
FIG. 11
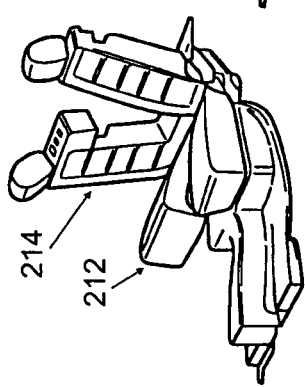
FIG. 10

VEHICLE SEAT CONFIGURATION

CROSS-REFERENCE TO RELATED APPLICATIONS

This application is a continuation, under 35 U.S.C. §120, of copending International Application No. PCT/EP2005/013050, filed Dec. 1, 2005, which designated the United States; this application also claims the priority rights, under 35 U.S.C. §119, of German Patent Application No. DE 10 2005 008 306.4, filed Feb. 16, 2005 and of German Patent Application No. DE 10 2005 020 335.3, filed Apr. 27, 2005; the prior applications are herewith incorporated by reference in their entirety.

FIELD OF THE INVENTION

The invention relates to a vehicle seat configuration, in particular to a motor vehicle seat configuration.

BACKGROUND OF THE INVENTION

Motor vehicle seats are conventionally implemented as seats with a seat frame that is made of metal. This results, in particular in the case of motor vehicle seats having a foldable backrest, in a material-intensive implementation of the kinematics components of the folding mechanism, because the loads are transferred to the vehicle body via these kinematics components.

For motor vehicle seats having a foldable backrest there are solutions according to which the seat part is folded up in a forward direction and the backrest part is folded down into the space that becomes available in this manner. It is furthermore known to provide motor vehicle seats with foldable backrest parts and seat parts that can be lowered, wherein the backrest part can be folded onto the seat part in order to create essentially levels surfaces, in particular loading surfaces.

A motor vehicle seat of this type is for example disclosed in German Patent No. DE 198 41 363 C1. With this motor vehicle seat, the backrest can be folded onto the seat part, in order to create an additional loading surface adjacent to the luggage space wherein the additional loading surface is formed by the backside of the backrest. In order to have the additional loading surface extend essentially on the level of the floor of the luggage space, the seat must be as flat as possible when it is in its folded position. In order to achieve this, the seat part is lowered and is moved forward relative to the folding axis of the backrest when the backrest is folded forward. The seat part supports itself on the vehicle floor via a front swing arm (motion link) which is connected to the backrest via a rigid linkage. This linkage transfers the folding motion of the backrest to the swing arm such that the swing arm pivots forward and lowers the seat part as well as moves the seat part forward.

German Patent No. DE 199 62 424 C1 discloses a solution for a motor vehicle seat having a backrest and a seat part. The backrest is foldable about a folding axis. In the front region of the seat, the seat part is supported via a swing arm which can be swiveled in a longitudinal direction, wherein the folding motion of the backrest is transferred to the swing arm via the linkage such that the seat part is lowered by swiveling the swing arm when folding the backrest forward and is again raised when folding back the backrest.

A disadvantage of the conventional solutions is however that large portions of the seat part have to be engineered as a metal structure in order to meet the high demands with respect to stability. As a result, the seat is heavy. Furthermore, expensively structured kinematics components are required for these foldable seat assemblies because the loads are transferred into the vehicle body via these kinematics components. Therefore, a large number of precautions with respect to safety, such as a reinforced anchoring of the seat parts in the floor of the vehicle body are to be taken, in order to prevent that the seat breaks away in the case of an accident. In addition, the high weight has a disadvantageous effect on fuel consumption.

SUMMARY OF THE INVENTION

It is accordingly an object of the invention to provide a vehicle seat configuration which overcomes the above-mentioned disadvantages of the heretofore-known motor vehicle seats of this general type and whose construction has a weight that is significantly reduced when compared to conventional solutions.

With the foregoing and other objects in view there is provided, in accordance with the invention, a vehicle seat configuration, including:

a motor vehicle seat including a seat part with a first unit and a second unit;

a vehicle body floor;

the second unit of the seat part being disposed between the first unit of the seat part and the vehicle body floor, the second unit of the seat part being formed of an expanded polypropylene foam or a material having properties comparable to expanded polypropylene foam with respect to firmness and weight; and the first unit of the seat part being directly or indirectly connected to the vehicle body floor via the second unit of the seat part disposed between the first unit of the seat part and the vehicle body floor.

In accordance with another feature of the invention, the motor vehicle seat includes a foldable backrest.

In accordance with yet another feature of the invention, the first unit of the seat part is a movable unit and the second unit of the seat part is fixed with respect to the vehicle body floor and is substantially formed of expanded polypropylene foam.

According to another feature of the invention, the movable unit of the seat part is configured to be forward-foldable about a rotation axis; and the foldable backrest is configured to be tiltable about a further rotation axis such that the foldable backrest rests directly or indirectly on the second unit of the seat part that is fixed with respect to the vehicle body floor.

According to a further feature of the invention, the foldable backrest has a reinforcement in a region where the foldable backrest rests on the second unit of the seat part that is fixed with respect to the vehicle body floor.

According to another feature of the invention, the motor vehicle seat includes a backrest part; the backrest part is foldable onto the seat part for creating a substantially flat area and the backrest part is configured to be operable with one hand; the seat part has a seating area and the seat part is displaceable with respect to the vehicle body floor when folding the backrest part; and at least one connecting element connects a seat part frame and a backrest part frame to one another in a movable manner such that folding the backrest part about a rotation axis from a use position to a non-use position causes a simultaneous vertical and horizontal movement of the seat part with respect to the vehicle body floor, and such that the backrest part rests directly or indirectly on the seating area of the seat part.

In accordance with yet another feature of the invention, the seat part includes a frame structure.

In accordance with another feature of the invention, the frame structure is embodied as a profiled frame structure.

According to a further feature of the invention, the first unit of the seat part is a movable unit formed of expanded polypropylene foam and the second unit of the seat part is fixed with respect to the vehicle body floor; and the frame structure is laid in foam in the movable unit of the seat part.

According to another feature of the invention, the seat part includes a fastening element; and a further fastening element is configured to correspond to the fastening element such that the further fastening element can be fastened to the seat part with the fastening element.

In accordance with yet another feature of the invention, the fastening element and the further fastening element can be unfastened from one another.

With the objects of the invention in view there is also provided, a vehicle seat configuration, including:

a motor vehicle seat including a seat part;

a vehicle body floor; and the seat part being directly or indirectly connected to the vehicle body floor and the seat part being substantially formed of an expanded polypropylene foam or a material having properties comparable to expanded polypropylene foam with respect to firmness and weight.

In accordance with another feature of the invention, the seat part includes a movable unit and a unit that is fixed with respect to the vehicle body floor and is substantially formed of expanded polypropylene foam.

According to a further feature of the invention, the movable unit of the seat part is configured to be forward-foldable about a rotation axis; and the foldable backrest is configured to be tiltable about a further rotation axis such that the foldable backrest rests directly or indirectly on the unit of the seat part that is fixed with respect to the vehicle body floor.

According to another feature of the invention, the foldable backrest has a reinforcement in a region where the foldable backrest rests on the unit of the seat part that is fixed with respect to the vehicle body floor.

In accordance with another feature of the invention, the frame structure is laid in foam in the seat part.

In other words, according to the invention, there is provided a motor vehicle seat, wherein an element formed of EPP foam (EPP=expanded polypropylene) or of a material with comparable properties with respect to firmness and weight is provided between a seat part and a vehicle body floor, wherein the seat part is directly or indirectly connected to the vehicle body floor via the element formed of EPP foam or of the material with comparable properties with respect to firmness (resistance) and weight, or wherein the seat part consists essentially of EPP foam or of a material with comparable properties with respect to firmness and weight and is directly or indirectly connected to the vehicle body floor.

A particular advantage of the vehicle seat according to the invention is the low weight of the vehicle seat. The reduction of the weight of the seat structure is made possible in accordance with the invention by using a polymer foam or a comparable material, because now there is a direct force transmission, i.e. a direct transfer of forces, into the vehicle body. The reduction of the weight has an especially advantageous effect on the behavior of the seat in case of an accident. As a result of the low weight, the fastening of the seat on the floor need not be designed as sturdy as in the case of a conventional use of a metal construction.

An additional advantage of using a seat structure of polymer foam is that prototypes of this seat structure can be made available within a short period of time. For example, a conversion of a vehicle model from foldable seats that are operable with two hands to seats that can be operated with one hand is possible within a short period of time, even if the seat structure is to be newly developed in order to keep the amount of changes to the vehicle small. The polymer foam that is used is preferably an EPP foam (EPP=expanded polypropylene). As a result of using the vehicle seat according to the invention production costs are also lowered.

A preferred embodiment of the motor vehicle seat according to the invention provides that the motor vehicle seat has a foldable backrest.

In accordance with the invention there is furthermore provided that the seat part has a movable unit and a unit that this fixed with respect to the vehicle floor consisting essentially of polymer foam. A preferred embodiment is implemented in that the movable unit of the seat part can be folded forward about a rotation axis and the backrest can be tilted about a second rotation axis such that the backrest rests directly or indirectly on the unit of the seat part that is fixed with respect to the vehicle floor. It is advantageous if the backrest has a reinforcement in the region where the backrest rests on the unit of the seat part that is fixed with respect to the vehicle body floor. Such a reinforcement can for example be created to by an EPP profile that is laid in foam in the backrest part or by using foams of different densities.

Another preferred embodiment of the motor vehicle seat according to the invention, provides that the seat part is provided with a frame structure. It is especially advantageous if the frame structure is embodied as a profiled frame structure and/or if the frame structure is laid in foam in the movable unit of the seat part that consists of polymer foam. The profiled frame structure ensures a high torsional rigidity such that it can replace conventional metal seat frames without limitations with respect to safety.

It is furthermore advantageous if the seat part has at least one fastening element with which a second fastening element, which is embodied in a corresponding manner, can be fastened to the seat part. For example, in case of such an embodiment, a seat cover, which has such second fastening elements, can be fastened to the seat part (preferably detachably) through the use of the fastening elements of the seat part. These fastening elements are preferably embodied as profiles which can then be latched or clipped together.

In accordance with a further preferred embodiment of the invention, the motor vehicle seat is directly or indirectly connected to the vehicle body via at least one movable fastening element and includes a foldable, one-hand operable backrest part with a backrest part frame as well as a seat part with a seat part frame, wherein the backrest part is foldable onto the seat part that can be lowered for creating an essentially flat surface and wherein the seat part is movable with respect to the vehicle body when the backrest part is folded, wherein at least one connecting element connects the backrest part frame and the seat part frame in a movable manner such that, when the backrest part is folded about the first rotation axis from the use position into the non-use position, a simultaneous vertical and horizontal movement of the seat part with respect to the vehicle body is caused and such that the backrest part comes to rest directly or indirectly on the seating area of the seat part. This solution creates in an advantageous manner a simple construction which allows for an easy folding of the backrest by a one-hand operation and additionally reduces the weight of the vehicle seat. Since the seat according to this embodiment rests practically flat on the vehicle body floor when using motor vehicle seats with foldable, one-hand operable backrests, the elements of the displacement mechanism have to be designed essentially only for the stress or forces occurring during the folding the backrest part. This is the case because the elements of the displacement mechanism no longer have to compensate other forces on their own, such as for example forces that are present in case of an emergency braking or in case of an accident, because the element or unit formed of polymer foam now absorbs a large part of the forces. The reduction in the weight of the vehicle seat and, respectively, of the vehicle itself, results in a reduced fuel consumption. The use of the invention furthermore results in advantages with respect to packaging because the weight that is saved by using the seat structure allows a correspondingly increased payload.

In accordance with another preferred embodiment of the invention, the seat part is lowered when the backrest part is folded. This effect can be assisted by providing the foam material (for example the polyurethane foam) of the seat and/or the backrest with only modest contours. As a result it is possible to lower the backrest to an especially low level which allows for an essentially level loading surface or cargo area to be created.

In a preferred embodiment of invention, a motion link or swing arm is used as a connecting element. When using this motion link, a folding of the backrest part causes a forced movement of the seat part. Depending on the construction of the embodiment, this motion link is disposed on both sides of the motor vehicle seat. The at least one motion link is pivotably disposed at a first fastening point at the backrest part frame provided on a second rotation axis. The motion link is rigidly disposed at a second fastening point at the seat part frame of the seat part. Instead of using a motion link or swing arm as a connecting element, it is also possible to use a coupling rod, a lever configuration or a push rod.

According to specific embodiments it is furthermore provided that the backrest part is, via at least one rear leg as a fastening element at the backrest part frame pivotable on the first rotation axis, displaceable with respect to the vehicle body and is directly or indirectly, via a guide rail or the like, fixedly connected to the vehicle body, or that the seat part is, via at least a front leg as a fastening element at the seat part frame pivotable on a third rotation axis, displaceable relative to the vehicle body and is directly or indirectly, via a guide rail or the like, via a fourth rotation axis pivotably connected to the vehicle body, or that the backrest part has a lock for latching the motor vehicle seat at the vehicle body, or that the backrest part has a cover element for forming a flat surface adjacent to a loading platform or the like in a non-use position of the motor vehicle seat.

Other features which are considered as characteristic for the invention are set forth in the appended claims.

Although the invention is illustrated and described herein as embodied in a motor vehicle seat configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 8 to 13 are diagrammatic views for illustrating the structural configuration of the vehicle seat formed of an EPP unit and a seating area of PU (polyurethane) foam according to the invention and for illustrating the course of movement when folding down the backrest;

DESCRIPTION OF THE PREFERRED EMBODIMENTS

Figure 1:
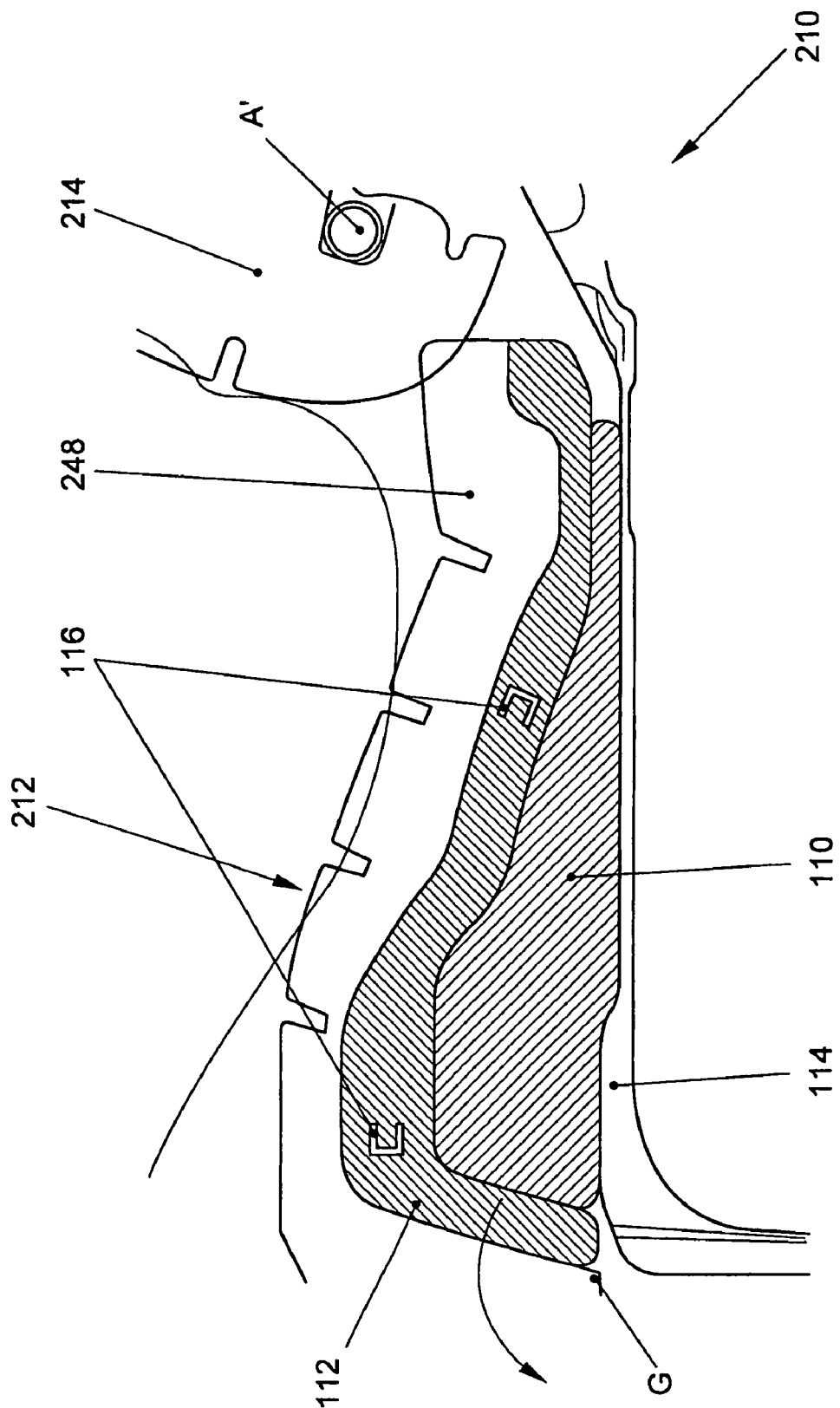
FIG. 1 is a diagrammatic partial sectional view illustrating a motor vehicle seat according to the invention, the motor vehicle seat having a seat part embodied as a two-part configuration and having a frame structure that is laid in foam in the movable unit of the seat part.

Referring now to the figures of the drawings and first, particularly, to FIG. 1 thereof, there is shown an exemplary embodiment of a motor vehicle seat 210 for explaining the invention in detail. In this embodiment, the seat part 212 is constructed of two EPP (expanded polypropylene) units, an EPP unit 110 that is fixed with respect to the floor (vehicle body floor) and a movable EPP unit 112. The EPP unit 110 that is fixed with respect to the floor may for example be screwed directly to the vehicle body structure via plastic inlays that are laid in foam. The EPP unit 110 that is fixed with respect to the floor is distinguished in that it is formed as an EPP support wedge. This has the advantage that forces, in particular forces that act in the driving direction, are transferred uniformly and over a large area directly into the vehicle floor.

Figure 14:
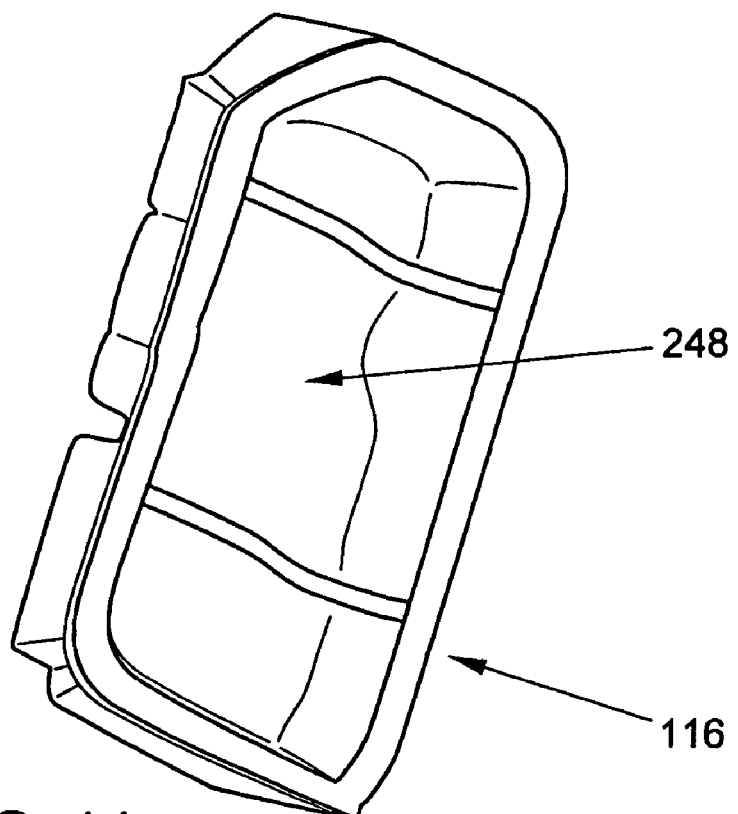
FIG. 14 is a diagrammatic perspective view of a seat part provided with a profiled insert part according to the invention.

The movable EPP unit of the seat part 212 is formed of a seating area 248 of PU (polyurethane) foam and of the movable EPP unit 112 which is embodied as an EPP seat carrier. In the embodiment illustrated in FIG. 1, the movable EPP unit 112 of the seat part 212 can be tilted forward by rotating about a rotation axis G. Subsequently it is possible to fold the backrest part 214 forward about the rotation axis A'. A profiled frame structure 116 is laid in foam in the movable EPP unit 112 which is embodied has the EPP seat carrier. The profiled frame structure 116 ensures a high torsional rigidity and thus replaces the seat well made of metal (in some cases implemented as a double-walled seat well). Alternatively, the profiled frame structure 116 can also be disposed between the seating area 248, which is formed of PU foam, and the movable EPP unit 112, which is embodied as an EPP seat carrier (see FIG. 14).

Figure 15:
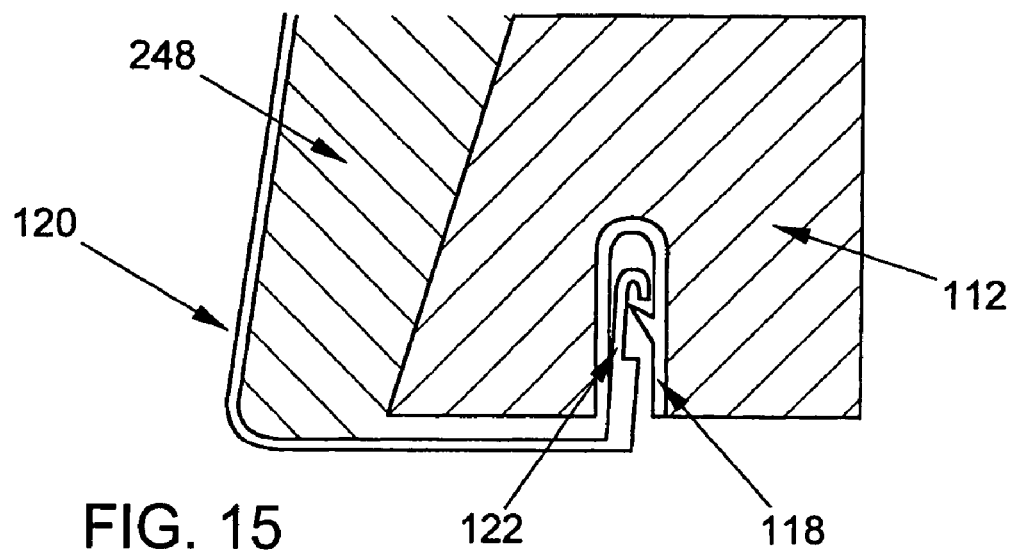
FIG. 15 is a diagrammatic partial sectional view illustrating the fastening of a seat cover to the seat part trough the use of two plastic profiles according to the invention.

In a further exemplary embodiment of the vehicle seat 210 (see FIG. 15) according to the invention, the movable EPP unit 112, which is embodied as an EPP seat carrier, has fastening elements 118 on its bottom side, such as for example a plastic profile, through the use of which the seat cover 120 can be fastened by a correspondingly shaped profiled piece 122 by latching the profiled piece 122, which is attached to the seat cover 122, in the fastening element 118. In order to achieve a uniform fastening of the seat cover 120, the fastening element 118 (for example a plastic profile) can be laid in foam all the way around in the movable EPP unit 112 which is embodied as an EPP seat carrier. Alternatively, a profile can also be molded directly into the movable EPP unit 112 for fastening purposes such that the profiled piece 122, which is attached to the seat cover 120, is clipped directly into the movable EPP unit 112, which is embodied as an EPP seat carrier. In accordance with a preferred embodiment, the fastening of the seat cover 120 can be released.

Figure 2:
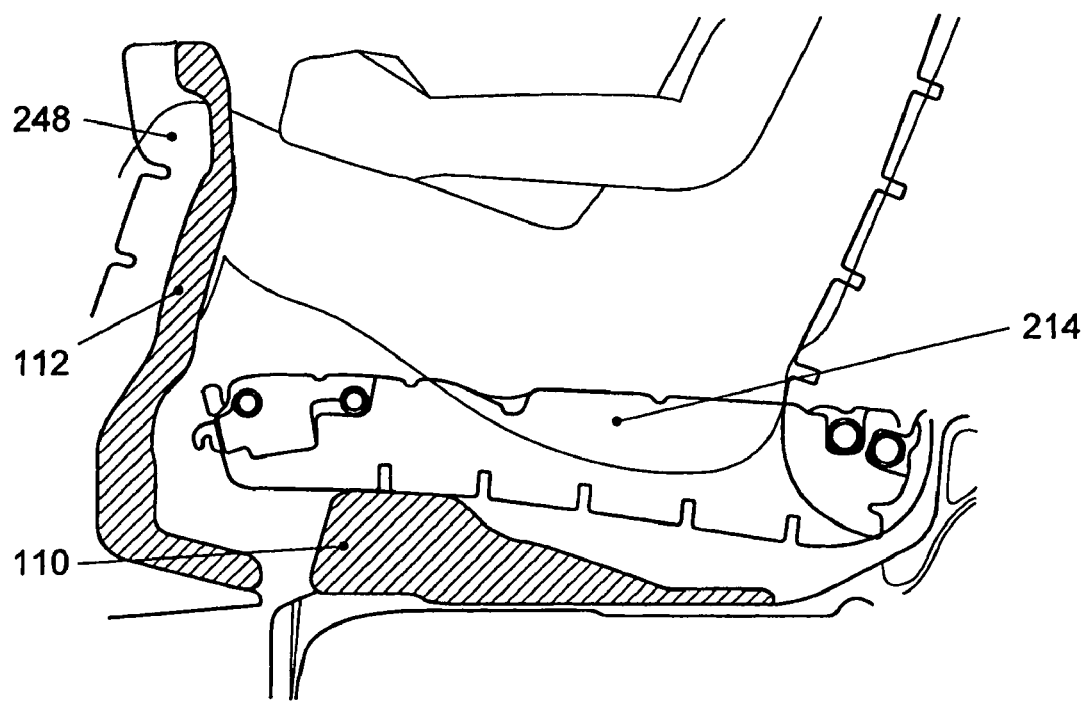
FIG. 2 is a diagrammatic partial sectional view illustrating a first variant of an embodiment of a motor vehicle seat according to the invention with a folded-down backrest part in the non-use position, wherein the backrest part rests directly on the firm EPP (expanded polypropylene) wedge (without an arresting hook)
Figure 3:
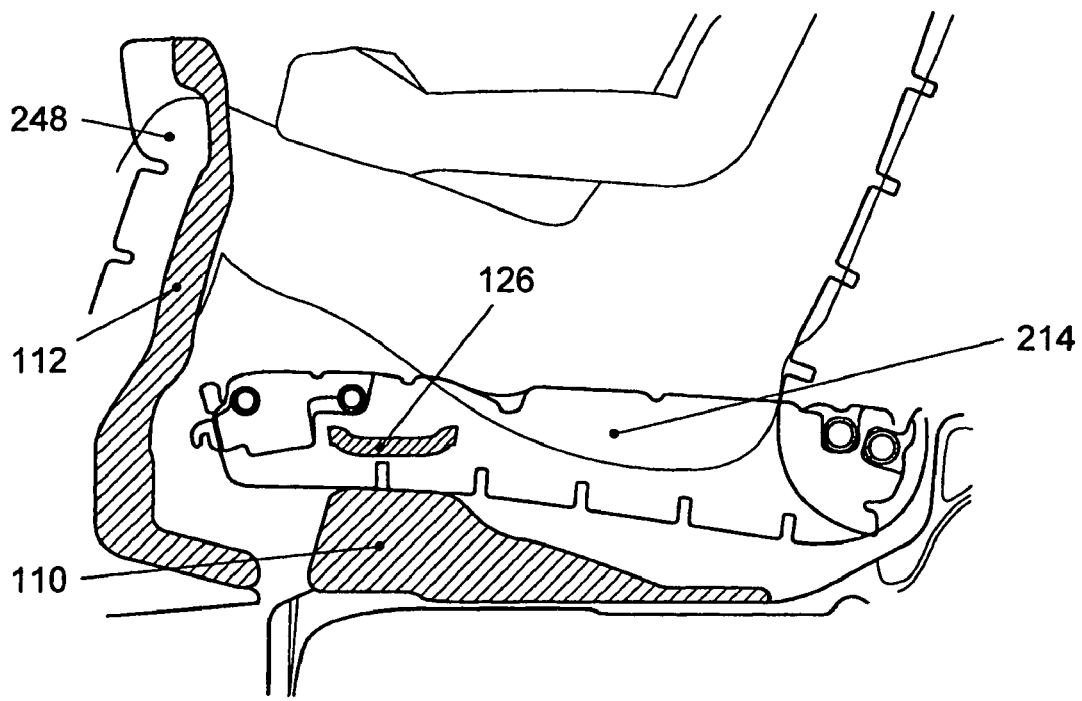
FIG. 3 is a diagrammatic partial sectional view illustrating a second variant of an embodiment of a motor vehicle seat according to the invention with a folded-down backrest part in the non-use position, wherein the backrest part has an additional EPP reinforcement that is laid in foam and wherein the backrest part rests directly on the firm EPP (expanded polypropylene) wedge (without an arresting hook)
Figure 4:
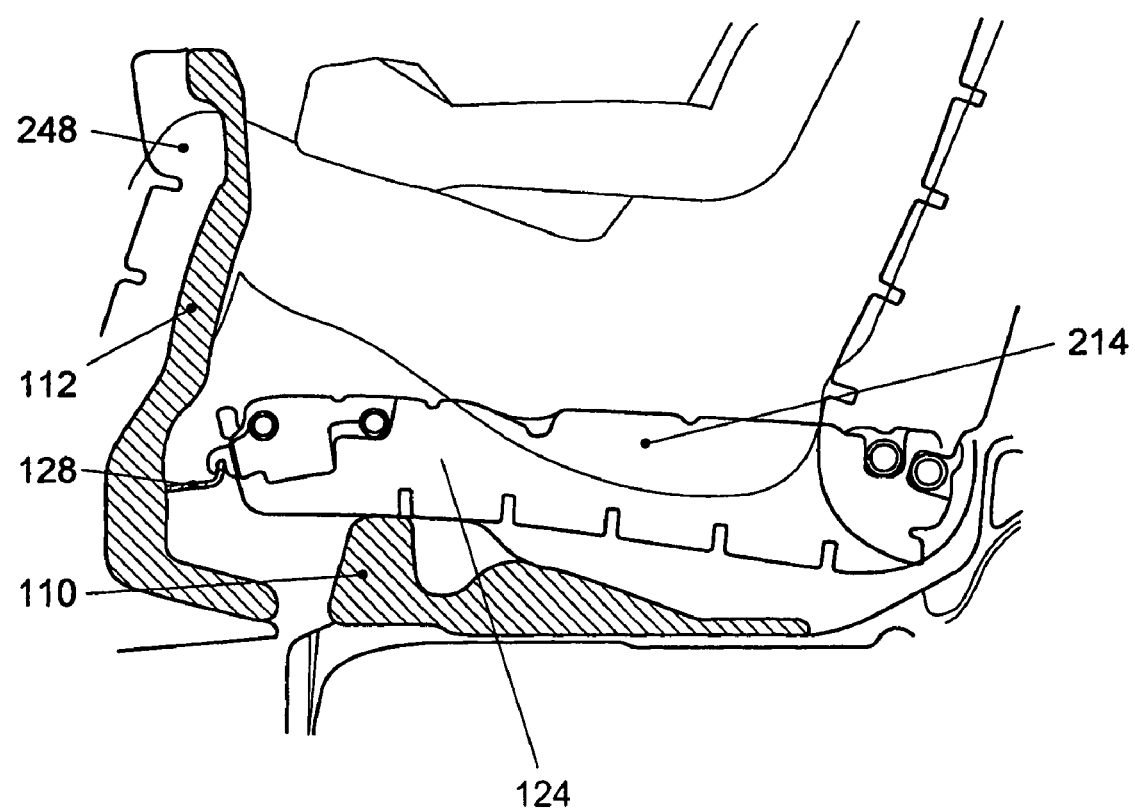
FIG. 4 is a diagrammatic partial sectional view illustrating a third variant of an embodiment of a motor vehicle seat according to the invention with a folded-down backrest part in the non-use position, wherein the backrest part rests directly on the firm EPP (expanded polypropylene) wedge and is additionally supported by an arresting hook.

Different alternatives for the backrest placement are shown in FIGS. 2 to 4. FIG. 2 shows the movable EPP unit 112 of the seat part 212 and its folded up (lifted up) position and the EPP unit 110 which is fixed with respect to the floor. The backrest part 214 is folded forward and rests directly on the wedge-shaped EPP unit 110 which is fixed with respect to the floor. Because the backrest foam structure 124 can be damaged by deformation in case of high stress due to loading (payload) when the backrest part 214 rests directly on the EPP unit 110, a preferred embodiment provides an additional reinforcement, which is laid in foam, in the backrest part 214, the additional reinforcement preferably being an additional EPP profile 126. As a result, the deformations are significantly reduced by improving the load forces. The reinforcement of relevant regions of the backrest part 214 can also be achieved by using foams having different densities. These reinforcements are preferably also adjusted with respect to the seating comfort and/or driving comfort.

A further possibility to prevent damage to the backrest part 214 is shown in FIG. 4. In this solution, an arresting hook 128 is attached to the movable EPP unit 112 of the seat part 212 such that the arresting hook 128 accepts the folded-down backrest part 214 and thus takes the load off the backrest foam structure 124.

In order to protect the backrest foam structure 124 and, respectively, the covering of the backrest part 214 when the backrest part 214 rests directly on the EPP unit 110, the EPP unit 110, which is fixed with respect to the floor, can be covered with a pattern that is not easily soiled, such as needle felt or TOP.

The above-explained exemplary embodiments describe a mechanism according to which the folding-down operation of the backrest part 214 is done in two steps, i.e. folding up the movable EPP unit 112 of the seat part 212 and subsequently folding down the backrest part 214. On the other hand, there are solutions which allow folding down the backrest part 214 in one step, namely vehicle seats 210 with a so called one-hand operable folding function. These vehicle seats can also be embodied in accordance with the invention.

Figure 5:
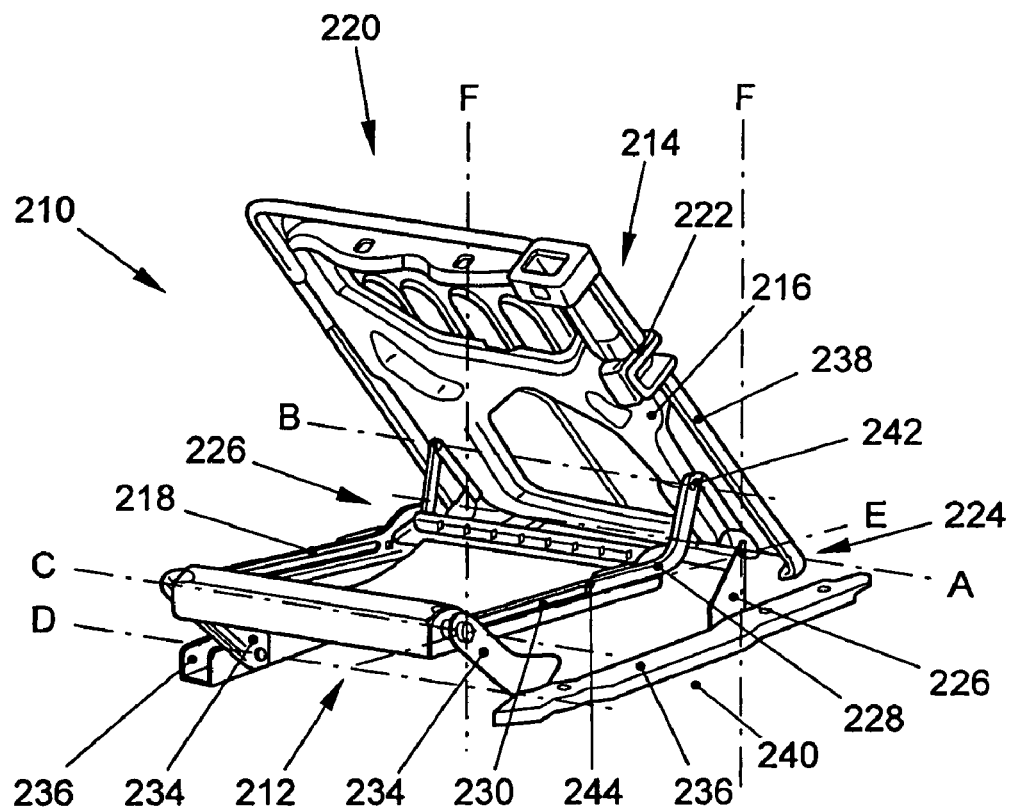
FIG. 5 is a diagrammatic perspective view of a motor vehicle seat according to the invention with a foldable backrest that can be operated with one hand, wherein the figure illustrates a folding movement from a use position into a non-use position.
Figure 6:
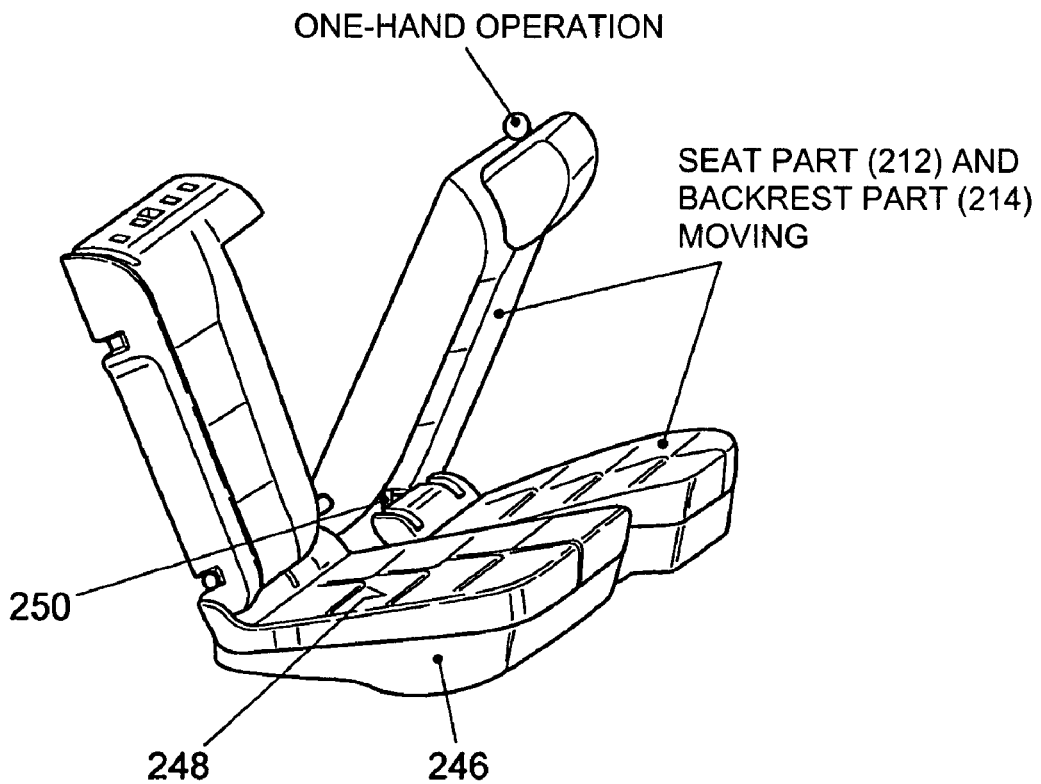
FIGS. 6 and 7 are diagrammatic perspective views illustrating the seat configuration and course of movement when folding down the backrest into the final position in accordance with the invention.
Figure 7:
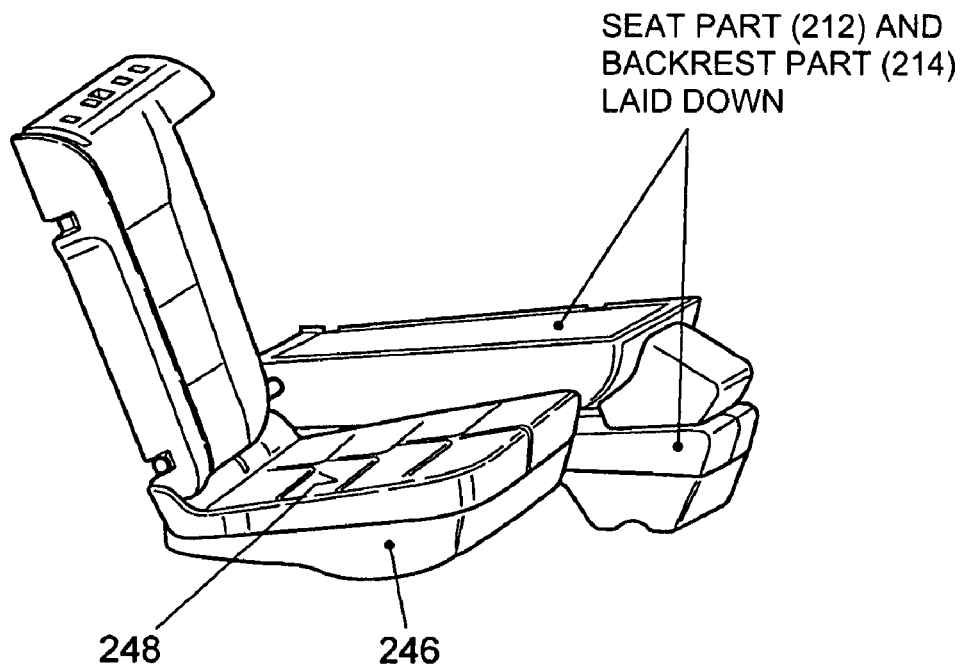

Even though the general functional principle of one-hand operable, foldable backrests is known, a feasible embodiment is briefly described. FIG. 5 shows a motor vehicle seat 210 which includes a seat part 212 and a backrest part 214. The backrest part 214 includes a backrest part frame 216 and the seat part 212 includes a seat part frame 218. FIG. 5 shows the motor vehicle seat 210 when it is in an already partly folded position. The unlatching of the backrest part 214 is in this case performed by the lock 222 which provides the connection to the vehicle body 240 when the motor vehicle seat 210 is in the use position. The lock 222 is disposed in the region between a backrest part top side 220 and a backrest part bottom side 224. The backrest part 214 forms a first rotation axis A in the region of the backrest part bottom side 224 for a rotation with respect to the vehicle body 240. The backrest part 214 is pivotably mounted on the first rotation axis A via pin-like elements on a rear leg 226 which is provided on both sides and is directly or indirectly connected to the vehicle body 240. Alternatively, the backrest part 214 can also be pivotably connected directly to the vehicle body 240 via pin-like elements. The rear leg 226 in FIG. 5 is rigidly connected to a guide rail 236 which in turn is connected to the vehicle body 240. FIG. 5 thus shows a motor vehicle seat 210 that is indirectly connected to the vehicle body 240.

The motor vehicle seat 210 can of course in this case additionally be shifted in the direction of travel and against the direction of travel. A shifting in a direction transverse to the direction of travel is also possible without requiring substantial changes for the solution of this exemplary embodiments. The backrest part 214 and the seat part 212 are connected to one another solely via a motion link (swing arm) 228. This motion link 228, which is disposed at least on one side, is on the one hand pivotably disposed at a first fastening point 242 at a pin-type web and, if disposed on both sides, forms a second rotation axis B. On its side facing toward the seat part frame 218, the motion link 228 is fixedly connected to the seat part frame 218 at a second fastening point 244. As a result of providing the motion link 228 on both sides and fastening the motion link 228 to the seat part frame 218, there is a high stability of the backrest part frame 216 with respect to the seat part frame 218. The seat part frame 218 can have a receptacle 230 for receiving the motion link 228 which is shown in FIG. 5 for example in the form of a groove. The seat part 212 itself is pivotable on a third rotation axis C, i.e. displaceable in a vertical and horizontal direction with respect to the vehicle body 240, in that a front leg 234, which is provided on both sides and which forms a fourth rotation axis D, is directly or indirectly connected to the vehicle body 240 as is shown in FIG. 5. In the exemplary embodiment, the front leg 234 which is provided on both sides is, corresponding to the rear leg 226 which is provided on both sides, pivotable in the guide rail 236 and indirectly connected to the vehicle body 240.

In accordance with the embodiment, the backrest part 214 is provided with a cover 238 in order to form a loading platform (cargo floor) in a motor vehicle that is flat and as large as possible. If the motor vehicle seat 210 is now to be folded from a use position into a non-use position, first the lock 222 is unlatched and the backrest part 214 is displaced along a horizontal axis E and, with respect to a vertical axis F, in the direction toward the seat part 212. The folding of the backrest part 214 takes place on the first rotation axis A.

Due to a constraining control (forced movement) with the horizontal and vertical movement of the backrest part 214, there is an analog movement of the seat part 212. Due to the rigid configuration of the motion link 228, the motion link 228, which is pivotably disposed on the second axis B, now shifts the seat part 212 via the third and fourth rotation axis C and D vertically and horizontally with respect to the vehicle body 240.

A simple one-hand operation for folding the motor vehicle seat 210 is possible in particular after getting past the vertical axis F of the backrest part 214 because the center of gravity of the backrest part 214 is shifted in a direction toward the seat part 212. An easy folding of the motor vehicle seat 210 can thus be performed in a particularly advantageous manner with an especially simple constructive solution.

Other embodiments of vehicle seats with foldable backrests that can be operated with one hand are disclosed in German Patent No. DE 198 41 363 C1 and in German Patent No. DE 199 62 424 C1.

This functional principle is adopted in a preferred embodiment of the vehicle seat according to the invention as is shown in FIGS. 6 to 15. FIGS. 6 to 15 illustrate a vehicle seat whose backrest part 214 (comparably to the solution described in German Patent No. DE 198 41 363 C1) is connected, via a coupling rod 250, to the displacement mechanism of the seat part 212. After the backrest part 214 is unlatched, the backrest part 214 can be folded forward by using one hand, wherein the seat part 212, which is controlled by the pivotably mounted front leg, is simultaneously horizontally and vertically displaced in a combined movement. In this case the seat part 212 is first lifted up during the horizontal movement and is subsequently again lowered as is illustrated in FIGS. 10 to 13. FIGS. 6 to 15 furthermore show the configuration of the seat part 212 formed of an EPP seat structure 246 and a seating area 248 formed of PU foam.

FIGS. 8 and 9 also show in more detail the structural configuration of an embodiment of the vehicle seat according to the invention. In this case a seat part 212 is made up of a one-piece EPP seat structure 246 and a seating area of PU foam. In FIGS. 8 and 9 it can be clearly seen that the EPP seat structure 246 rests almost entirely on the vehicle body floor when it is in its use position. Thus, as described above, a large part of the forces that act horizontally are compensated such that the loads on the displacement mechanism are reduced. As a result, the displacement mechanism can be implemented with a reduced weight. FIG. 9 shows the complete seat part 212 formed of an EPP seat structure 246 and a seating area 248 formed of PU foam.

As has been mentioned above, FIGS. 10 to 13 show various phases when folding down the backrest part 214. In this illustration, it can be seen that both elements of the seat part 212, the EPP seat structure 246 and the seating area 248 of PU foam, shift forward when folding down the backrest part 214. As an alternative to this, an EPP unit can be installed fixed with respect to the floor, such that it is not moved when folding down the backrest part 214, but only the seat part 212 shifts forward. In this embodiments, the seat part 212 can also be constructed of an EPP seat structure 246 and a seating area 248 of PU foam. It may also be advantageous to use an embodiment with an EPP unit that is fixed with respect to the floor and a seat part 212 that is formed only of a seating area 248 of PU foam.

The embodiments of the invention are not limited to the above described preferred exemplary embodiments. Rather, a number of variants are conceivable which utilize the configuration and method according to the convention, even in case of embodiments that are fundamentally different. In particular, instead of using EPP foam, any other material having comparably properties with respect to weight and firmness may be used.

LIST OF REFERENCE NUMERALS

100 EPP unit fixed with respect to floor
112 movable EPP unit
114 vehicle body structure
116 profiled frame structure
118 fastening element
120 seat cover
122 profiled piece
124 backrests foam structure
126 additional EPP profile
128 arresting hook
210 motor vehicle seat
212 seat part
214 backrest part
216 backrest part frame
218 seat part frame
220 backrest part top side
222 lock
224 backrest part bottom side
226 rear leg
228 motion link
230 receptacle
234 front leg
236 guide rail
238 cover for backrest part
240 vehicle body
242 first fastening point
244 second fastening point
246 EPP seat structure
248 seating area of PU foam
250 coupling rod
A' rotation axis
A first rotation axis
B second rotation axis
C third rotation axis
D fourth rotation axis
E horizontal axis
F vertical axis
G rotation axis

What is claimed is:

1. A vehicle seat configuration, comprising:
a motor vehicle seat including a seat part with a first unit and a second unit;
a vehicle body floor, said vehicle body floor defining a longitudinal vehicle axis;
said second unit of said seat part being disposed between said first unit of said seat part and said vehicle body floor, said second unit of said seat part being fixed with respect to said vehicle body floor, said second unit of said seat part being formed of expanded polypropylene foam;
said first unit of said seat part being a movable unit and being one of directly and indirectly connected to said vehicle body floor via said second unit of said seat part disposed between said first unit of said seat part and said vehicle body floor;
said second unit of said seat part being an expanded polypropylene foam support wedge, said expanded polypropylene foam support wedge being configured to transfer forces from said first unit of said seat part to said vehicle body floor such that forces acting in a driving direction are transferred uniformly and over a large area directly into said vehicle body floor, the driving direction being essentially parallel to the longitudinal vehicle axis; and
said expanded polypropylene foam support wedge having a rearmost edge and a forward-most edge, said expanded polypropylene foam support wedge having a thinnest region at said rearmost edge and having a thickest region at said forward-most edge, said expanded polypropylene foam support wedge increasing in thickness from said thinnest region at said rearmost edge toward said thickest region at said forward-most edge.

2. The vehicle seat configuration according to claim 1, wherein said motor vehicle seat includes a foldable backrest.

3. The vehicle seat configuration according to claim 1, wherein said movable unit of said seat part is formed of a seating area of polyurethane foam and an expanded polypropylene foam seat carrier.

4. The vehicle seat configuration according to claim 2, wherein said foldable backrest has a reinforcement in a region where said foldable backrest rests on said second unit of said seat part that is fixed with respect to said vehicle body floor.

5. The vehicle seat configuration according to claim 1, wherein:
    said motor vehicle seat includes a backrest part;
    said backrest part is foldable onto said seat part for creating a substantially flat area and said backrest part is configured to be operable with one hand;
    said seat part has a seating area and said seat part is displaceable with respect to said vehicle body floor when folding said backrest part; and
    at least one connecting element connects a seat part frame and a backrest part frame to one another in a movable manner such that folding said backrest part about a rotation axis from a use position to a non-use position causes a simultaneous vertical and horizontal movement of said seat part with respect to said vehicle body floor, and such that said backrest part rests one of directly and indirectly on said seating area of said seat part.

6. The vehicle seat configuration according to claim 1, wherein said movable unit of said seat part includes a frame structure.

7. The vehicle seat configuration according to claim 6, wherein said frame structure is embodied as a profiled frame structure.

8. The vehicle seat configuration according to claim 6, wherein:
    said movable unit of said seat part is formed of expanded polypropylene foam; and
    said frame structure is laid in foam in said movable unit of said seat part.

9. The vehicle seat configuration according to claim 1, wherein:
    said seat part includes a fastening element; and
    a further fastening element is configured to correspond to said fastening element such that said further fastening element can be fastened to said seat part with said fastening element.

10. The vehicle seat configuration according to claim 9, wherein said fastening element and said further fastening element can be unfastened from one another.

11. The vehicle seat configuration according to claim 3, wherein:
    said movable unit of said seat part is configured to be forward-foldable about a rotation axis; and
    said foldable backrest is configured to be tiltable about a further rotation axis such that said foldable backrest rests one of directly and indirectly on said second unit of said seat part that is fixed with respect to said vehicle body floor.

* * * * *

UNITED STATES PATENT AND TRADEMARK OFFICE
CERTIFICATE OF CORRECTION

PATENT NO. : 7,874,607 B2
APPLICATION NO. : 11/893239
DATED : January 25, 2011
INVENTOR(S) : Andreas Weiss et al.

It is certified that error appears in the above-identified patent and that said Letters Patent is hereby corrected as shown below:

On the Title Page, Item (73):

"Assignees:   Volkswagen Aktiengesellschaft, Wolfsburg (DE); Dr. Ing. h.c. F. Prosche Aktiengesellschaft, Stuttgart (DE)"

should read:

--Assignees:   Volkswagen Aktiengesellschaft, Wolfsburg (DE); Dr. Ing. h.c. F. Porsche Aktiengesellschaft, Stuttgart (DE)--

Signed and Sealed this
Twenty-sixth Day of April, 2011

David J. Kappos
*Director of the United States Patent and Trademark Office*